(12) United States Patent
Ciris

(10) Patent No.: US 12,549,785 B2
(45) Date of Patent: *Feb. 10, 2026

(54) SYSTEMS AND METHODS TO INSERT SUPPLEMENTAL CONTENT INTO PRESENTATIONS OF TWO-DIMENSIONAL VIDEO CONTENT BASED ON INTRINSIC AND EXTRINSIC PARAMETERS OF A CAMERA

(71) Applicant: 4D Sight, Inc., San Francisco, CA (US)

(72) Inventor: Erhan Ciris, Beyoglu (TR)

(73) Assignee: 4D Sight, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,147

(22) Filed: Feb. 23, 2024

(65) Prior Publication Data

US 2024/0267574 A1    Aug. 8, 2024

Related U.S. Application Data

(63) Continuation of application No. 18/163,653, filed on Feb. 2, 2023, now Pat. No. 11,968,410.

(51) Int. Cl.
*H04N 21/234* (2011.01)
*G06T 7/70* (2017.01)

(52) U.S. Cl.
CPC ......... *H04N 21/23424* (2013.01); *G06T 7/70* (2017.01); *G06T 2207/10016* (2013.01); *G06T 2207/30244* (2013.01)

(58) Field of Classification Search
CPC .... H04N 21/23424; G06T 2207/10016; G06T 2207/30244; G06T 7/70
See application file for complete search history.

(56) References Cited

U.S. PATENT DOCUMENTS

| | | | |
|---|---|---|---|
| 2013/0031582 A1* | 1/2013 | Tinsman | H04N 21/4316 725/36 |
| 2016/0117722 A1* | 4/2016 | Garcia | G06Q 30/02 705/14.49 |
| 2019/0075339 A1* | 3/2019 | Smith | H04N 21/25883 |
| 2019/0174170 A1 | 6/2019 | Chen | |
| 2019/0222776 A1* | 7/2019 | Carter | H04N 5/272 |
| 2020/0074739 A1* | 3/2020 | Stauber | G06F 3/011 |
| 2020/0111267 A1* | 4/2020 | Stauber | G06F 3/011 |

* cited by examiner

*Primary Examiner* — Mulugeta Mengesha
(74) *Attorney, Agent, or Firm* — Esplin & Associates, PC

(57) ABSTRACT

Systems and methods for inserting supplemental content into presentations of two-dimensional video content based on the intrinsic and extrinsic parameters of a camera are disclosed. Exemplary implementations may: obtain two-dimensional video content depicting a three-dimensional space; obtain supplemental content; obtain values of intrinsic parameters for the camera; obtain values of extrinsic parameters for the camera; identify presentation locations in the three-dimensional space based on the two-dimensional video content; determine integration information for the supplemental content based on the values of intrinsic and extrinsic parameters; modify the two-dimensional video content to include the supplemental content at the identified presentation location in accordance with the integration information; and/or perform other operations.

20 Claims, 4 Drawing Sheets

SYSTEMS AND METHODS TO INSERT SUPPLEMENTAL CONTENT INTO PRESENTATIONS OF TWO-DIMENSIONAL VIDEO CONTENT BASED ON INTRINSIC AND EXTRINSIC PARAMETERS OF A CAMERA

FIELD OF THE DISCLOSURE

The present disclosure relates to inserting supplemental content into a presentation of two-dimensional video content based on intrinsic parameters and extrinsic parameters of a camera.

BACKGROUND

Streaming of two-dimensional video content is known. Streaming may be used to deliver continuous video content over a network, from a source to a destination, using minimal intermediate network storage. Current solutions to insert supplemental content into streamed video content requires complex content level integration, third-party plugins, or specialized cameras, and therefore are costly and time inefficient.

SUMMARY

One aspect of the present disclosure relates to inserting supplemental content into presentations of two-dimensional video content based on intrinsic parameters and extrinsic parameters of a camera. The insertion of the supplemental content may be made as the two-dimensional video content is being streamed over a network. The supplemental content may be inserted into the video content to appear as though it was pre-existing graphical content on one or more surfaces in the video content. The video content may be computer generated and/or live-action. The surface(s) on which the supplemental content is inserted may be computer generated and/or present in the real world. The insertion of supplemental content into presentations of video content may be used to provide supplemental messaging to viewers of the video content and/or for other purposes.

The system configured to insert supplemental content into presentations of two-dimensional video content based on intrinsic parameters and extrinsic parameters of a camera may include one or more of electronic storage, one or more hardware processors, and/or other components. The electronic storage may be configured to store information. The stored information may include one or more machine learning algorithms that are ready to be executed, models of three-dimensional spaces, and/or other information. The one or more hardware processors may be configured to execute one or more computer processing components. The one or more computer processing components may include one or more of a content component, a parameter component, an integration component, a modification component, and/or other components.

The content component may be configured by machine-readable instructions to obtain two-dimensional video content and/or other content. The two-dimensional video content may depict a two-dimensional view of a three-dimensional space. The two-dimensional view of the three-dimensional space may be defined by a two-dimensional field of view of the camera.

The content component may be configured by machine-readable instructions to obtain supplemental content and/or other content. The supplemental content may be inserted into the two-dimensional video content.

The parameter component may be configured by machine-readable instructions to obtain values of intrinsic parameters of the camera. The transformation of the three-dimensional space into a two-dimensional view may be based on the values of the intrinsic parameters of the camera.

The parameter component may be configured by machine-readable instructions to obtain values of extrinsic parameters of the camera. The values of extrinsic parameters may characterize the relative position of the camera within the three-dimensional space.

The integration component may be configured by machine-readable instructions to identify a presentation location within the three-dimensional space. The identification may be based on the two-dimensional video content and/or other information. The presentation location may have a surface within the three-dimensional space suitable for presentation of the supplemental content.

The integration component may be configured by machine-readable instructions to determine integration information for the supplemental content and/or other information. The integration information may be determined based on the values of intrinsic and extrinsic parameters of the camera, the identified presentation location, and/or other information. The integration information may transform the supplemental content placed at the identified presentation location within the three-dimensional space to the two-dimensional field of view of the camera.

The modification component may be configured by machine-readable instructions to modify the two-dimensional video content to include the supplemental content at the identified presentation location in accordance with the integration information and/or other information. By way of non-limiting illustration, the supplemental content may appear to be present in the two-dimensional video content on the surface of the identified presentation location.

As used herein, any association (or relation, or reflection, or indication, or correspondency) involving servers, processors, client computing platforms, software applications, two-dimensional video content, three-dimensional spaces, visible and/or non-visible physical features, visual content, views, fields of view, positions, angles, versions, steps, formats, selections, determinations, comparisons, analyses, improvements, reductions, presentations, notifications, user interfaces, user interface elements, portions, fields, and/or another entity or object that interacts with any part of the system and/or plays a part in the operation of the system may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "determine" (and derivatives thereof) may include measure, calculate, compute, estimate, approximate, extract, generate, and/or otherwise derive, and/or any combination thereof. As used herein, the term "identify" (and derivatives thereof) may include recognize, established, derive, confirm, verify, connect, confirm, include, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
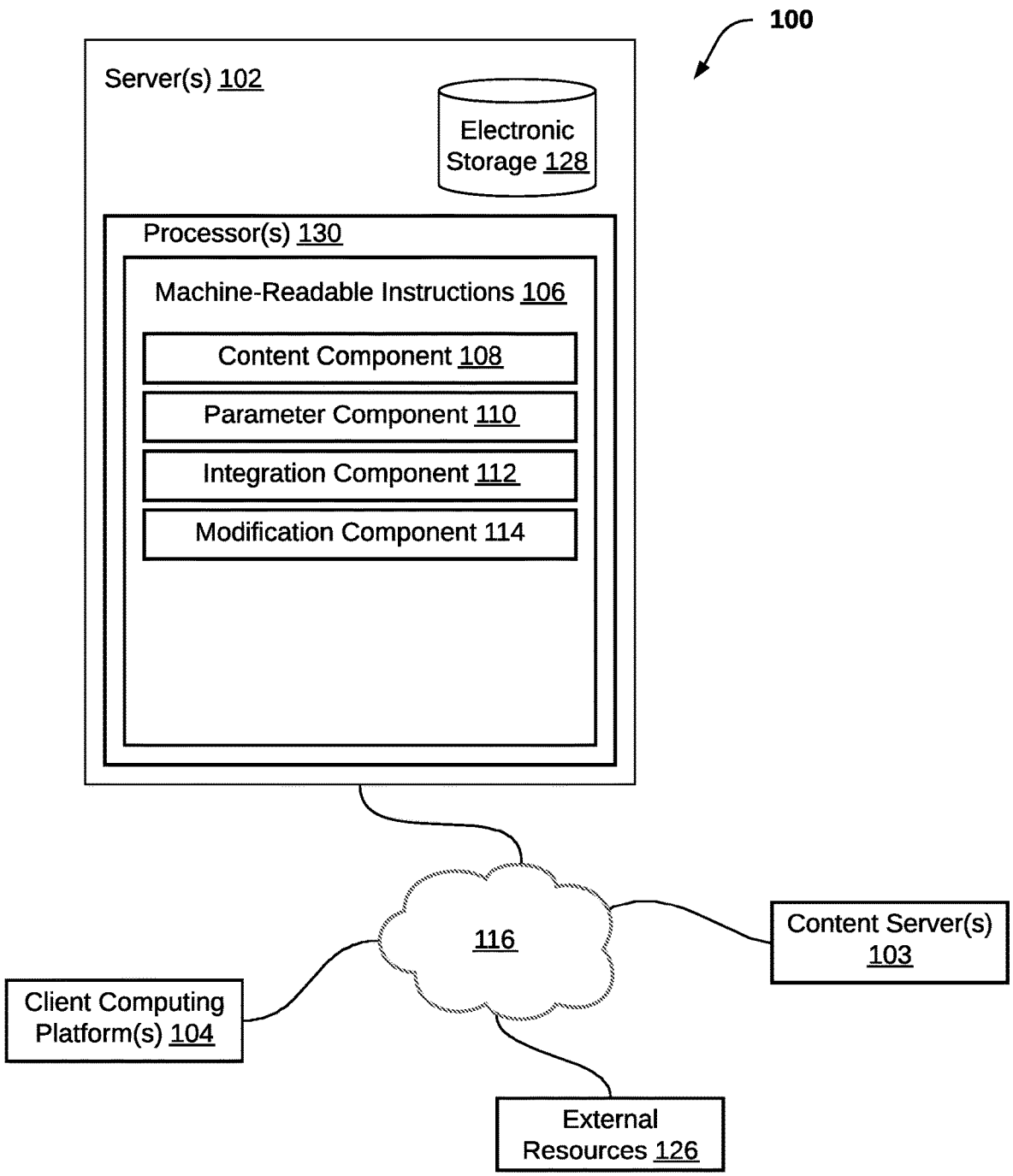
FIG. 1 illustrates a system configured to insert supplemental content into presentations of two-dimensional video content, in accordance with one or more implementations.

FIG. 1 illustrates a system 100 configured to insert supplemental content into presentations of two-dimensional video content based on intrinsic parameters and extrinsic parameters of a camera, in accordance with one or more implementations. Current solutions for embedding advertisement content and/or other content into videos may be inefficient and/or require additional software and/or hardware components. Embedding visual content and/or other content into videos for streaming is common for sporting video content and electronic-sporting (i.e., e-sporting) video content. Video content may require content level integration and/or content specific solutions in order for visual content and/or other content placement to be determined and/or to be accurately inserted. One or more implementations presented herein may facilitate inserting supplemental content into presentations of two-dimensional video content in a more efficient manner than solutions that are currently available.

As used herein, two-dimensional video content may simple be referred to as a video and/or video content. The video content may include audio content, visual content, and/or other content. Two-dimensional video content may refer to the dimensionality of the visual content. For example, two-dimensional visual content representing a three-dimensional space may be referred to as two-dimensional video content. In some implementations, the video may be one or more of a live video, a pre-recorded video, and/or other types of videos. In some implementations, a live video may relay content that is happening in real-time or near real-time to the video content viewer and/or during production of the video. In some implementations, the video may be optimized to be streamed via one or more video streaming platforms and/or other presentation platforms.

Referring to FIG. 1, in some implementations, system 100 may include one or more server(s) 102, one or more content server(s) 103, one or more client computing platform(s) 104, external resources 126, and/or other components. Server(s) 102 may be configured to communicate with one or more client computing platform(s) 104 according to a client/server architecture and/or other architectures. Client computing platform(s) 104 may be configured to communicate through one or more networks 116 with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processor(s) 130 configured by machine-readable instructions 106, and/or other components. The non-transitory electronic storage 128 may store one or more machine learning algorithms, one or more models, and/or other information. Machine-readable instructions 106 may include one or more instruction components. The instruction components may include computer program components. The computer program components may include one or more of a content component 108, a parameter component 110, an integration component 112, a modification component 114, and/or other components. Executing the machine-readable instructions 106 may cause server(s) 102 to insert supplemental content into presentations of two-dimensional video content. In some implementations, supplemental content may be inserted into presentations of two-dimensional video content during streaming of the two-dimensional video content from a source server to a destination server. Insertion of supplemental content may be done in real-time or near real-time during streaming of the two-dimensional video content. Streaming of two-dimensional video content can be achieved by delivering the video content directly from the source server to the destination server. Streaming of two-dimensional video content may also be achieved by delivering the video content from the source server to one or more intermediate servers, then from the one or more intermediate servers to the destination server. In some implementations, the two-dimensional video content may be received by server 102 from the source server that may be included in the one or more content server(s) 103. After two-dimensional video content is received by server 102, the one or more computer program components may modify the two-dimensional video content to insert supplemental content. The modified two-dimensional video content may then be outputted by server 102 to the destination server that may be included in the one or more content server(s) 103. In some implementation, server 102 may be an intermediate server in the process of streaming the two-dimensional video content from the source server to the destination server.

Content component 108 may configured to obtain two-dimensional video content and/or other types of content. The two-dimensional video content may have been captured by a camera. In some implementations the two-dimensional video content may be one or more of a live video, a pre-recorded video, a video stream, and/or other types of video content. In some implementations, the two-dimensional video content may be one or more of a .MOV, .MP4, .MPEG-4, .WMV, .AVI, and/or other video file formats. The two-dimensional video content may be optimized for streaming and/or have other optimization features. The two-dimensional video content may depict a two-dimensional view of a three-dimensional space. The two-dimensional view depicted in the video content may be defined by a two-dimensional field of view of the camera used to capture the video content. The three-dimensional space may represent one or more of a sporting arena, a gaming environment, a real-world environment, a digital environment, and/or other types of three-dimensional spaces. In some implementations, the view of the three-dimensional space may change based on the progression through the two-dimensional video content. Progression through the video content may be defined by a start of the video content, an end of the video content, a time duration of the video content, and/or other information. The view may include one or more visible physical features and/or other features present in the three-dimensional space. In some implementations, visible physical features may include stationary objects, mobile objects, ground planes, and/or surfaces, aerial spaces, and/or other features present in the three-dimensional space.

In some implementations, content component 108 may be configured to obtain a model of the three-dimensional space. The model may be one or more of a mathematical coordinate-based representation of a three-dimensional space, a collection of three-dimensional data points related by a coordinate system, and/or other three-dimensional digital structures. The model may define the one or more visible physical features in the three-dimensional space. The one or more visible physical features may be defined by one or more of a relative position to a coordinate system of the three-dimensional space, relative position to other physical features in the three-dimensional space, relative size and/or scale, and/or other information. Information defining the one or more visible physical features may be stored and/or included in the model. In some implementations, the model may be based on the obtained two-dimensional video content and/or other video content depicting the same three-dimensional space. The one or more visible physical features that are defined in the model may be the same as/or similar to the one or more visible physical features depicted in the view of the two-dimensional video content. In some implementations, obtaining the model may include one or more of accessing a previously stored model (e.g., from electronic storage 128), determining the model, receiving the model from an external source (e.g., a source of the video content), updating a previously determined and/or stored model, and/or other mechanisms for obtaining the model.

In some implementations, the model of the three-dimensional space may be obtained via one or more machine learning algorithms and/or other methods. The one or more machine learning algorithms may be stored in electronic storage 128. In some implementations, the one or more machine learning algorithms may be configured to use the obtained two-dimensional video content to generate the model of the three-dimensional space. In some implementations, the one or more machine learning algorithms may receive the two-dimensional video content and/or other video content depicting the same three-dimensional space as input to be analyzed, scanned, mapped, and/or other methods of processing the two-dimensional video content. The one or more machine learning algorithms may extract information pertaining to the three-dimensional space depicted in the two-dimensional video content. The extracted information may be used to generate the model, may be stored in the model, and/or may be used to enhance an existing model. In some implementations, obtaining a model through one or more stored machine learning algorithms may occur simultaneously or in real-time to the streaming of the two-dimensional video content.

In some implementations, the model of the three-dimensional space may be obtained from the user. The model may be constructed manually by the user, by one or more external machine learning algorithms, by one or more scanning techniques, and/or scene mapping of one or more two-dimensional video contents, and/or other methods. The predetermined model of the three-dimensional space may be based on the obtained two-dimensional video content and/or other video content depicting the same three-dimensional space. In some implementations, the model may include one or more of identified presentation locations, integration information, and/or other information. In some implementations, the model may be obtained in real-time and/or simultaneously to the streaming of the two-dimensional video content.

Content component 108 may be configured to obtain supplemental content. The obtained supplemental content may include supplemental visual content, such as video content, image content, and/or other visual content. The supplemental video content may have a format that is one or more of a .MOV, .MP4, .MPEG-4, .WMV, .AVI, .JPEG, .PDF, .TIFF, .GIF, and/or other file formats. The supplemental visual content may be configured to be inserted into the two-dimensional video content. By way of non-limiting example, supplemental content may include one or more of advertisements, wayfinding markers, scoreboards, environment enhancing graphics, and/or other information and/or other content.

In some implementations, obtained supplemental content may be personalized for individual users. By way of non-limiting illustration, supplemental content obtained for a first user of system 100 may be different than supplement content obtained for a second user of system 100. Supplemental content may be selected by the user and/or may be determined by one or more of machine learning algorithms stored in electronic storage 128 and/or other methods of determination and/or obtaining supplemental content. Supplemental content that is obtained may be different based on one or more of the subject matter of the two-dimensional video content, the genre of the two-dimensional video content, the target audience of the two-dimensional video content, and/or other information pertaining to the video content. The target audience of the two-dimensional video content may be determined by content component 108 and/or identified by the creator of the two-dimensional video content. For example, two-dimensional video content depicting a video game recording may obtain supplemental content that is different than the supplemental content obtained for two-dimensional video content depicting a real-world sporting event. In some implementation, supplemental content may be selected and/or determined for individual users based on historical user information associated with the individual users. Historical user information may be stored in electronic storage 128 and/or obtained via external resources 126. Historical user information associated with an individual user may characterize the individual user's demographics (e.g., age, gender, occupation, etc.), interests, behavioral trends, and/or other information. The historical user information associated with the individual user may be aggregated and/or determined based on the individual user's content (e.g., two-dimensional video content) viewing history, web browsing history, and/or other activity by the individual user.

Supplemental content may be selected and/or obtained for the individual user using a categorical approach. By the categorial approach, items of supplemental content may be associated with individual categories of users. Individual categories of users may be determined for specific values of demographics, types of interests, patterns of behavior trends, and/or based on other information pertaining to users. By way of non-limiting illustration, a first category of users may be determined to be adults between the ages of 18 and 25, a second category of users may be determined to be adults between the ages of 35 and 50, and so on and so forth. The recited categories of users are exemplary and not intended to be limiting. Items of supplemental content may be associated with individual categories of users, responsive to the items of supplemental content being well received by the users of the category of users. Items of supplemental content may be determined to be well received, responsive to the impressions of the items by the users meeting, and/or exceeding a threshold. The impressions may be based on interactions with the item (e.g., clicks by the user, viewing duration, etc.), and/or other information. Supplemental content obtained for the individual user may include items of supplemental content associated with individual categories of users to which the individual user belongs. The individual categories of users to which the individual user belongs may be determined based on the historical user information associated with the individual user.

Parameter component 110 may be configured to obtain values of intrinsic parameters of the camera. The transformation of the three-dimensional space into a two-dimensional view (i.e., the two-dimensional field of view of the camera) may be based on the values of intrinsic parameters of the camera. Individual intrinsic parameters of the camera may characterize individual geometric properties that affect image capture (e.g., of a three-dimensional space) by the camera. In some implementations, the intrinsic parameters may include one or more of a focal length, focal point, aperture, aspect ratio of the field of view, image sensor format, and/or other intrinsic parameters. The values of intrinsic parameters of the camera may be obtained from external resources 126, electronic storage 128, users via client computing platform(s) 104, and/or other components of system 100. The values of intrinsic parameters may be obtained from analysis of the obtained two-dimensional video content. By way of non-limiting illustration, the values of intrinsic parameters may be extrapolated by comparing the two-dimensional video content to an obtained model of the three-dimensional space. In some implementations, the values of intrinsic parameters of the camera may be aggregated to generate an intrinsic matrix for the camera. The intrinsic matrix may be applied to transform one or more points of a three-dimensional coordinate system of the camera to a two-dimensional image coordinate system. The three-dimensional coordinate system of the camera may have a point of origin that is a function of the position of the camera. In other words, the origin of the three-dimensional coordinate system of the camera may be the position of the camera itself. The two-dimensional image coordinate system may define the field of view of the camera and/or the view depicted in the two-dimensional video content.

Parameter component 110 may be configured to obtain values of extrinsic parameters of the camera. The values of extrinsic parameters may characterize the camera's relative position within the three-dimensional space. In some implementations the extrinsic parameters may include one or more of camera location within the three-dimensional space, camera orientation, and/or other types of extrinsic parameters. The values of extrinsic parameters of the camera may be obtained from external resources 126, electronic storage 128, users via client computing platform(s) 104, and/or other components of system 100. The values of extrinsic parameters may be obtained from analysis of the obtained two-dimensional video content. By way of non-limiting illustration, the values of extrinsic parameters may be extrapolated by comparing the two-dimensional video content to an obtained model of the three-dimensional space. In some implementations, the values of the extrinsic parameters may be aggregated to generate an extrinsic matrix for the camera. The extrinsic matrix may be applied to transform one or more points of a coordinate system of the three-dimensional space to the three-dimensional coordinate system of the camera. In some implementations, the coordinate system of the three-dimensional space will have a point of origin within the three-dimensional space. The point of origin may be defined and/or included in the obtained model of the three-dimensional space. In some implementations, the values of the intrinsic and extrinsic parameters of the camera may change based on the progression of the two-dimensional video content. By way of non-limiting illustration, values of the intrinsic parameters and extrinsic parameters may change as the camera moves around the three-dimensional space in accordance with the progression of the two-dimensional video content. For example, the two-dimensional video content may depict a player's view of first-person gameplay.

Integration component 112 may be configured to identify one or more presentation locations within the three-dimensional space. The identification may be based on the obtained two-dimensional video content and/or other information. The presentation location may have a surface within the three-dimensional space suitable for presentation of the supplemental content. In some implementations, the presentation locations may be identified in real-time or near real-time during the determination of content placement in the two-dimensional video content. The presentation locations may be identified subsequent to obtaining the model of the three-dimensional space, such that the obtained model may be analyzed for one or more suitable presentation locations. The presentation locations may be identified by analyzing the two-dimensional video content to identify depictions of surfaces that may be visible to a viewer of the two-dimensional video content. Suitable presentation locations may include one or more surfaces of one or more visible physical features and/or other features and/or objects in the three-dimensional space. In some implementations, the identified presentation location may be a surface of a visible physical feature and/or a portion of airspace within the three-dimensional space. The one or more surfaces may be identified as suitable presentation locations based one or more of visibility in the view of the two-dimensional video content, size of the surface, texture of the surface, angle of the surface relative to the camera position, and/or other information. In some implementations, the presentation locations may be predetermined. The presentation locations may be predetermined manually by the user, using one or more of external machine learning algorithms and/or other methods. The predetermined presentation locations may be identified based on the obtained model of the three-dimensional space, the two-dimensional video content, and/or other information.

Integration component 112 may be configured to determine integration information for the obtained supplemental content. Integration information may be based on the values of intrinsic and extrinsic parameters of the camera, the identified presentation location, and/or other information. The integration information may transform the supplemental content placed at the identified presentation location(s) within the three-dimensional space to the two-dimensional field of view of the camera. In some implementations, the supplemental content may be transformed via the intrinsic matrix, the extrinsic matrix, and/or other matrices. By way of non-limiting illustration, the transformation may include placing the supplemental content into the three-dimensional space (e.g., in the obtained model of the three-dimensional space) at the identified presentation location and applying (e.g., multiplying) the extrinsic matrix to the set of points defining the supplemental content in the coordinate system of the three-dimensional space. Applying the extrinsic matrix to the set of points defining the supplemental content in the coordinate system of the three-dimensional space may generate a set of points defining the supplemental content in the three-dimensional coordinate system of the camera. The transformation may further include applying the intrinsic matrix to the set of points defining the supplemental content in the three-dimensional coordinate system of the camera to generate a set of points defining the supplemental content in the two-dimensional image coordinate system. In some implementations, the transformation of the supplemental content may be performed without use of the obtained model of the three-dimensional space. In some implementations, the integration information may include scaling information, three-dimensional rotational position for the supplemental content, and/or other information. In some implementations, the integration information may include the presence of one or more occluding physical features within the three-dimensional space that occludes or partially occludes the identified presentation location from the field of view of the camera.

Modification component 114 may be configured to modify the two-dimensional video content to include the supplemental visual content in accordance with the integration information and/or other information. The supplemental visual content may be included in the two-dimensional visual content at the identified presentation locations. Modification of the two-dimensional video content may be in accordance with the integration information. By way of non-limiting example, the supplemental visual content may appear to be present in the two-dimensional video content on the surface of the identified presentation location. In some implementations, responsive to the identified presentation location being occluded or partially occluded, modifying the two-dimensional video content may include occluding or partially occluding the supplemental visual content at the identified presentation locations from the field of view. By way of non-limiting example, the supplemental visual content may appear to be occluded or partially occluded by the one or more occluding physical features of the integration information.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described in this disclosure is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 3A:
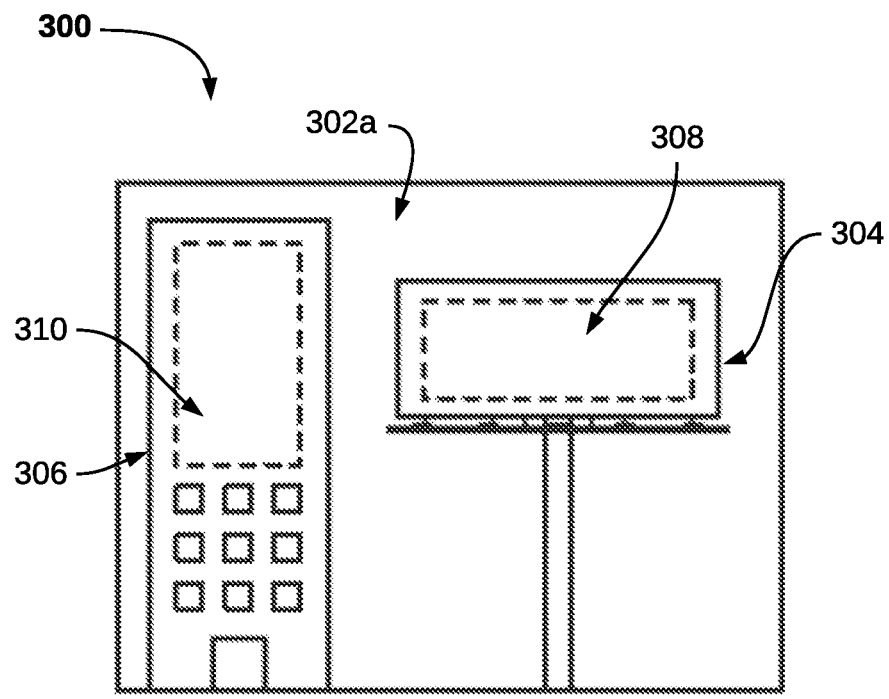
FIG. 3A-3B illustrates an exemplary implementation of a system configured to insert supplemental content into presentations of two-dimensional video content, in accordance with one or more implementations.

FIG. 3A illustrates a user interface 300 displaying a view of a frame of two-dimensional video content. Two-dimensional video content may depict a three-dimensional space 302a. Three-dimensional space 302a may include one or more of a first visible physical feature 306, a second visible physical feature 304, and/or other visible physical features and/or objects. In some implementations, the visibility of the one or more physical features in the view of the two-dimensional video content may be a function of the progress through the video content. For example, the frame of the two-dimensional video content shown in FIG. 3A may depict different features and/or objects than a second frame at a different point in the progress through the same two-dimensional video content. In some implementations, the view of the two-dimensional video depicting three-dimensional space 302a may be a function of the progress through the two-dimensional video content. For example, a first frame of the two-dimensional video content may present a first view of three-dimensional space 302a. A second frame of the two-dimensional video content may present a second view of three-dimensional space 302a. The first view and the second view may be the same or different and/or depend on the progression through the two-dimensional video content. The two-dimensional video content may include a number of frames that is based on the length of the video content and/or the rate of frames per second (FPS). In some implementation, the two-dimensional video content may have a rate of FPS of 16 FPS, 24 FPS, 30 FPS, 60 FPS, and/or other rates of FPS.

Referring to FIG. 3A, first visible physical feature 306 may include a surface 310 and/or other features and/or components. In some implementations, surface 310 may be in the view of the two-dimensional video content and/or partially in the view of the two-dimensional video content. First visible physical feature 306 may be a stationary feature, a mobile feature, and/or other types of features. By way of non-limiting example, first visible physical feature 306 is depicted as a building in the two-dimensional video content. Second visible physical feature 304 may include a surface 304 and/or other features and/or components. In some implementations, surface 304 may be in the view of the two-dimensional video content and/or partially in the view of the two-dimensional video content. Second visible physical feature 304 may be a stationary feature, a mobile feature, and/or other type of features. By way of non-limiting example, first visible physical feature 306 is depicted as a billboard and/or sign in the two-dimensional video content. Visibility of first visible physical feature 306, second visible physical feature 304, and/or other physical features may be a function of the progress through the two-dimensional video content. By way of non-limiting example, first visible physical feature 306 is fully visible in a first frame of the video content. First visible physical feature 306 may be fully visible, partially visible, or not shown in a second frame of the two-dimensional video content, the first frame being different from the second frame.

Figure 4:
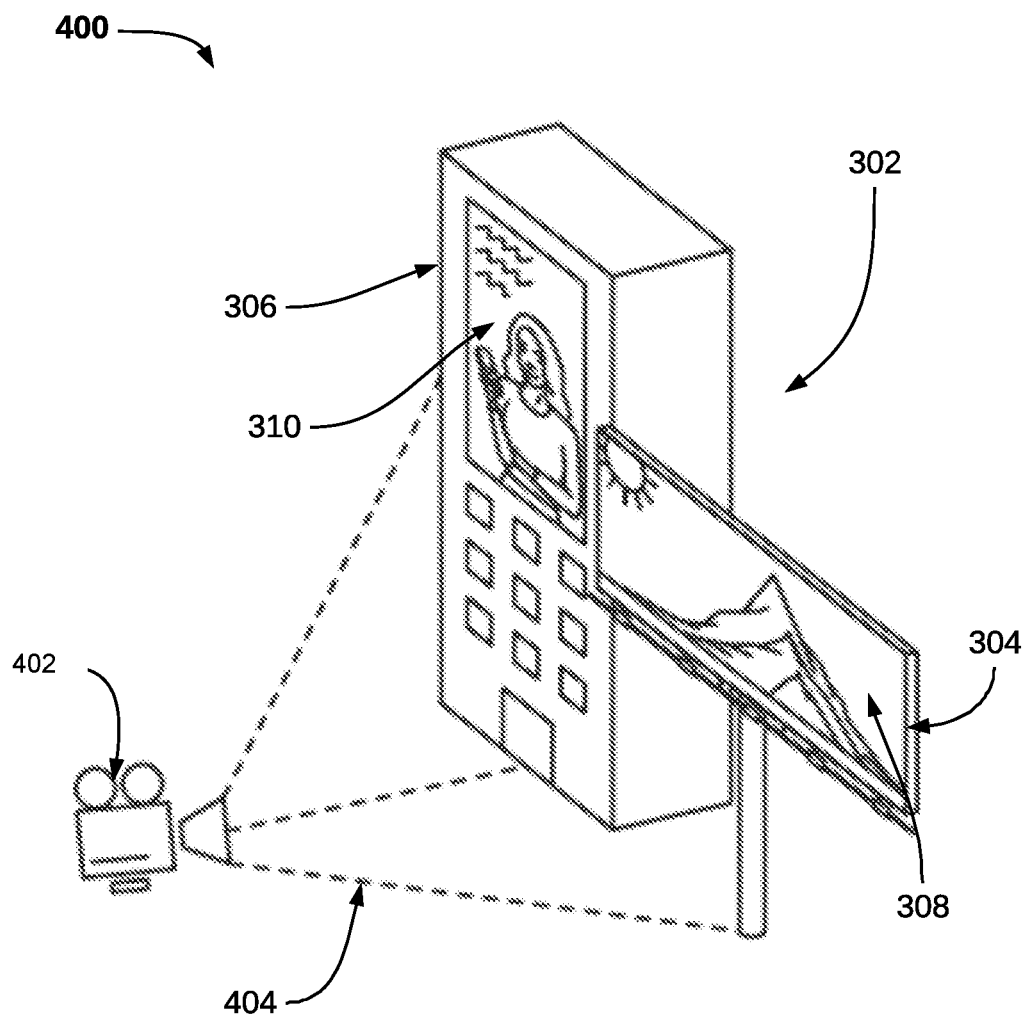
FIG. 4 illustrates an exemplary model of a three-dimensional space that may be used in a system configured to insert supplemental content into presentations of two-dimensional video content, in accordance with one or more implementations.

FIG. 4 illustrates a representation of a model 400. Model 400 may be based on and/or a representation of the three-dimensional space 302 depicted in the two-dimensional video content, which is the same as or similar to the three-dimensional space 302a depicted in the two-dimensional video content in FIG. 3A. Model 400 may define one or more of first visible physical feature 306, second visible physical feature 304, and/or other physical features and/or objects present in three-dimensional space 302. In some implementations, the one or more physical features and/or objects defined by model 400 may be determined by physical features and/or objects in the view of the two-dimensional video content. For example, the two-dimensional video content may depict a three-dimensional space; however, some objects in the three-dimensional space may not be presented in the view throughout the progression of the two-dimensional video content. Objects not presented in the view may not be included in the model of the three-dimensional space. In some implementations, model 400 may be based on and/or a representation of the two-dimensional video content and/or other videos depicting the same three-dimensional space. For example, model 400 may include one or more physical features and/or objects that are not presented in the view throughout the progression of the two-dimensional video content. The one or more physical features and/or objects may be presented in the view through the progression of the other videos depicting the same three-dimensional space that model 400 is based on.

Referring to FIG. 4, in some implementations, model 400 may include a camera position 402 (represented herein as a camera icon), a field of view 404 (represented herein by dashed lines extending from the camera icon), and/or other features and/or objects. In some implementations, camera position 402 may change based on the progression through the video content. For example, camera position 402 is based on the view of the frame of the video content depicted in FIG. 3A. Camera position 402 may change based on the view of the three-dimensional space as the video content progresses. Camera position 402 may be determined by comparing the depiction of the one or more visible features in the two-dimensional video content with the one or more visible features defined in model 400. In some implementations, a change in camera position 402 may result in a change of the field of view 404. In some implementations, model 400 may have one or more different defined camera positions. The one or more camera positions may correspond to one or more different frames of the two-dimensional video content. By way of non-limiting example, a first camera position may correspond to a first frame of the two-dimensional video content, a second camera position may correspond to a second frame of the two-dimensional video content, a third camera position may correspond to a third frame of the two-dimensional video content, and so on and so forth. In some implementations, field of view 404 may define the area of three-dimensional space 302 that is observable to the viewer of the two-dimensional video content depicting three-dimensional space 302.

Referring to FIG. 4, model 400 may include and/or be used to identify one or more presentation locations within the three-dimensional space. Model 400 may define first surface 310 on first visible physical feature 306, second surface 308 on first visible physical feature 304, and/or other surfaces present in the two-dimensional video content and/or other videos. In some implementations, surfaces of model 400 may include ground planes, aerial surfaces, and/or other types of surfaces. First surface 310, second surface 308, and/or other surfaces may be identified as a presentation location in the three-dimensional space. In some implementations, presentation locations may be identified and/or determined based on one or more of visibility in field of view 404, presence of one or more occluding physical features, surface texture, surface size, and/or other information. By way of non-limiting example, first surface 310 and second surface 308 may be within field of view 404 and may not be occluded by any occluding physical features. In some implementations, model 400 may be used and/or analyzed to determine integration information and/or other information. Model 400 may be analyzed manually by the user, by one or more machine learning algorithms, and/or other methods to determine integration information and/or other information. Integration information may be determined for supplemental visual content subsequent to the identification of one or more presentation locations in model 400. Integration information may include scaling information, three-dimensional rotation information, color readjustment information, and/or other information. In some implementations, integration information may be based on model 400, the visible physical features defined in model 400, obtained supplemental visual content, and/or other information and/or content.

Figure 3B:
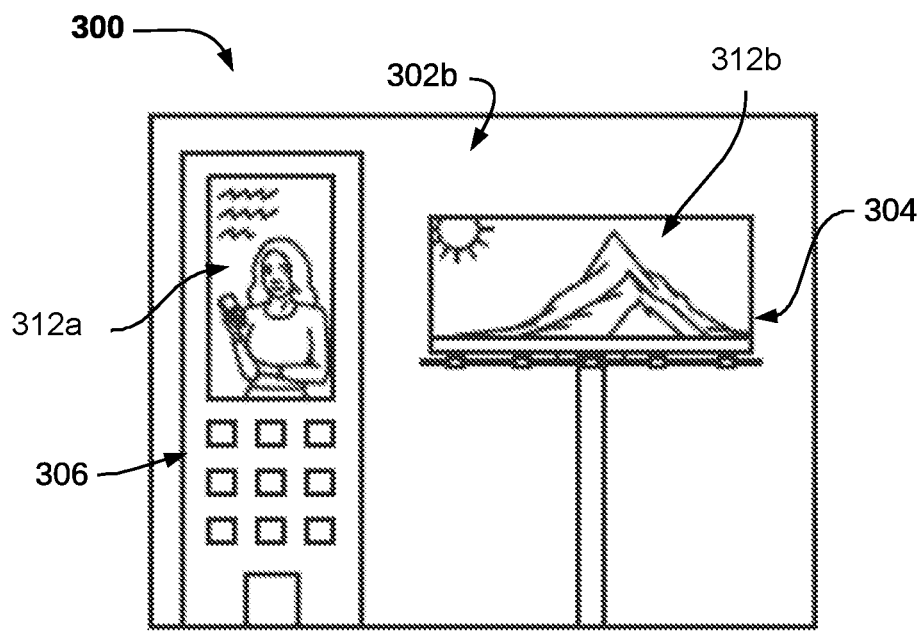

FIG. 3B illustrates user interface 300 displaying a view of a frame of two-dimensional video content subsequent to being modified to include supplemental visual content. Two-dimensional video content may depict a three-dimensional space 302b, which may be the same as or similar to the three-dimensional space depicted in FIG. 3A. The two-dimensional video content may depict one or more of first visual physical feature 306, second visible physical feature 304, and/or other features and/or objects. Two-dimensional video content may also include first supplemental visual content 312a, a second supplemental visual content 312b, and/or other content. In some implementations, modification of the two-dimensional video content may include the addition of first supplemental visual content 312a in one or more identified presentation locations. By way of non-limiting illustration, first supplemental visual content 312a may be included in the two-dimensional video content and may appear to be presented on the first surface 310 of first visible physical feature 306, responsive to surface 310 being identified as a suitable presentation location. First supplemental visual content 312a may be included in the two-dimensional video content in accordance with the determined integration information. By way of non-limiting example, first supplemental visual content 312a may have been scaled up or scaled down, such that first supplemental visual content 312a may fit within first surface 310 (indicated by the dashed box in FIG. 3A). First supplemental visual content 312a may have been rotated in accordance with three-dimensional rotation information, such that first supplemental visual content information may appear to be attached and/or lay flat on first surface 310.

In some implementations, modification of the two-dimensional video content may include the addition of second supplemental visual content 312b in one or more identified presentation locations. By way of non-limiting example, second supplemental visual content 312b may be included in the two-dimensional video content and may appear to be presented on the second surface 308 of second visible physical feature 304, responsive to surface 308 being identified as a suitable presentation location. Second supplemental visual content 312b may be included in the two-dimensional video content in accordance with the determined integration information. By way of non-limiting example, second supplemental visual content 312b may have been scaled up or scaled down, such that second supplemental visual content 312b may fit within second surface 308 (indicated by the dashed box in FIG. 3A). Second supplemental visual content 312b may have been rotated in accordance with three-dimensional rotation information, such that second supplemental visual content information may appear to be attached and/or lay flat on second surface 308. In some implementations, modification of the two-dimensional video content may occur for individual ones of frames included in the two-dimension video content, such that three-dimensional space 302b may appear to include one or more supplemental visual content in the one or more presentation locations throughout the progression of the two-dimensional video content.

Figure 2:
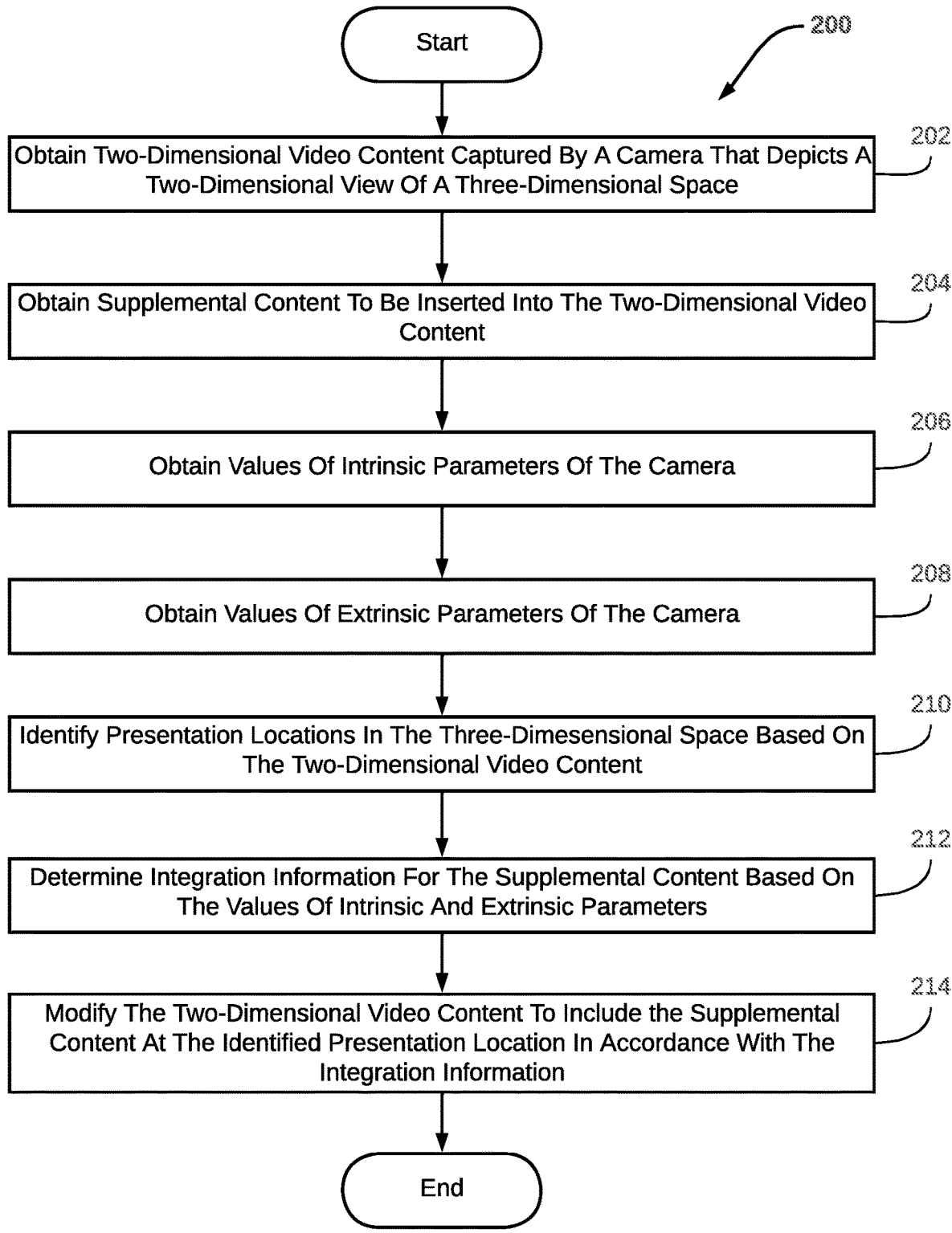
FIG. 2 illustrates a method for inserting supplemental content into presentations of two-dimensional video content, in accordance with one or more implementations.

FIG. 2 illustrates a method 200 for inserting supplemental content into presentations of two-dimensional video content based on intrinsic parameters and extrinsic parameters of a camera, in accordance with one or more implementations. The operations of method 200 presented below are intended to be illustrative. In some implementations, method 200 may be accomplished with one or more additional operations not described and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtaining two-dimensional video content. The two-dimensional video content may depict a two-dimensional view of a three-dimensional space. The two-dimensional view of the three-dimensional space may be defined by a two-dimensional field of view of the camera. In some embodiments, operation 202 is performed by a content component the same as or similar to content component 108 (shown in FIG. 1 and described herein).

An operation 204 may include obtaining supplemental visual content to be inserted into the two-dimensional video content. In some embodiments, operation 204 is performed by a content component the same as or similar to content component 108 (shown in FIG. 1 and described herein).

An operation 206 may include obtaining values of intrinsic parameters of the camera. A transformation of the three-dimensional space into a two-dimensional view may be based on the values of intrinsic parameters of the camera. In some embodiments, operation 206 is performed by a parameter component the same as or similar to parameter component 110 (shown in FIG. 1 and described herein).

An operation 208 may include obtaining values of extrinsic parameters of the camera. The values of extrinsic parameters may characterize the relative position of the camera within the three-dimensional space. In some embodiments, operation 208 is performed by a parameter component the same as or similar to parameter component 110 (shown in FIG. 1 and described herein).

An operation 210 may include identifying a presentation location within the two-dimensional video content based on the two-dimensional video content. The presentation location may have a surface in the three-dimensional space suitable for presentation of the supplemental visual content. In some embodiments, operation 210 is performed by an integration component the same as or similar to integration component 112 (shown in FIG. 1 and described herein).

An operation 212 may include determining integration information for the supplemental visual content based on the values of intrinsic and extrinsic parameters of the camera, the identified presentation location, and/or other information. The integration information may transform the supplemental content placed at the identified presentation location within the three-dimensional space to the two-dimensional field of view of the camera. The integration information may include scaling information, three-dimensional rotational position for the supplemental visual content, and/or other information. In some embodiments, operation 212 is performed by an integration component the same as or similar to integration component 112 (shown in FIG. 1 and described herein).

An operation 214 may include modifying the two-dimensional video content to include the supplemental visual content. The supplemental visual content may be included in the two-dimensional video content at the identified presentation locations. Modification of the two-dimensional video content may be in accordance with the integration information. By way of non-limiting example, the supplemental visual content may appear to be present in the two-dimensional video content on the surface of identified presentation location. In some embodiments, operation 214 is performed by a modification component the same as or similar to modification component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to insert supplemental content into a presentation of two-dimensional video content based on intrinsic parameters and extrinsic parameters of a camera, the system comprising:
   one or more physical processors configured by machine-readable instructions to:
      obtain two-dimensional video content captured by the camera, wherein the two-dimensional video content depicts a two-dimensional view of a three-dimensional space, wherein the two-dimensional view of the three-dimensional space is defined by a two-dimensional field of view of the camera;
      obtain supplemental content to be inserted into the two-dimensional video content;
      identify a presentation location within the three-dimensional space based on the two-dimensional video content, wherein the identified presentation location has a surface within the three-dimensional space suitable for presentation of the supplemental content;
      modify the two-dimensional video content to include the supplemental content at the identified presentation location in accordance with values of intrinsic parameters and one or more values of one or more extrinsic parameters that define the two-dimensional field of view of the camera, such that the supplemental content appears to be present in the two-dimensional video content on the surface of the identified presentation location,
         wherein the intrinsic parameters that define the two-dimensional field of view of the camera include at least one of focal length, focal point, aperture, and/or aspect ratio of the two-dimensional field of view.

2. The system of claim 1, wherein the three-dimensional space includes one or more visible physical features, and wherein the identified presentation location is a surface on a visible physical feature within the three-dimensional space or is a portion of airspace within the three-dimensional space.

3. The system of claim 2, wherein the one or more physical processors are further configured by machine-readable instructions to:
   obtain a model of the three-dimensional space that defines the one or more visible physical features within the three-dimensional space, and wherein one or more presentation locations are predetermined based on the model of the three-dimensional space.

4. The system of claim 1, wherein the two-dimensional video content is modified in accordance with the presence of one or more occluding physical features within the three-dimensional space that occludes or partially occludes the identified presentation location from the field of view of the camera.

5. The system of claim 4, wherein, responsive to the identified presentation location being occluded or partially occluded, the modified two-dimensional video content includes occluding or partially occluding the supplemental content at the identified presentation location from the field of view of the camera, such that the supplemental content appears to be occluded or partially occluded by the one or more occluding physical features.

6. The system of claim 1, wherein the values of the intrinsic parameters and the one or more values of the one or more extrinsic parameters of the camera change based on the progression of the two-dimensional video content.

7. The system of claim 1, wherein the supplemental content includes image content, video content, and text content.

8. The system of claim 1, wherein transformation of the three-dimensional space into a two-dimensional view is based on the values of the intrinsic parameters of the camera, and wherein the values of the intrinsic parameters are obtained from analysis of the obtained two-dimensional video content.

9. The system of claim 1, wherein the one or more values of the one or more extrinsic parameters characterize the relative position of the camera within the three-dimensional space, wherein the one or more extrinsic parameters include at least one of camera location within the three-dimensional space and camera orientation, wherein the camera orientation includes the positional angle of the camera.

10. The system of claim 1, wherein the two-dimensional video content is modified in accordance with scaling information and three-dimensional rotational position for the supplemental content.

11. A method for inserting supplemental content into a presentation of two-dimensional video content based on intrinsic parameters and extrinsic parameters of a camera, the method comprising:
   obtaining two-dimensional video content captured by the camera, wherein the two-dimensional video content depicts a two-dimensional view of a three-dimensional space, wherein the two-dimensional view of the three-dimensional space is defined by a two-dimensional field of view of the camera;
   obtaining supplemental content to be inserted into the two-dimensional video content;
   identifying a presentation location within the three-dimensional space based on the two-dimensional video content, wherein the identified presentation location has a surface within the three-dimensional space suitable for presentation of the supplemental content;
   modifying the two-dimensional video content to include the supplemental content at the identified presentation location in accordance with values of intrinsic parameters and extrinsic parameters that define the two-dimensional field of view of the camera, such that the supplemental content appears to be present in the two-dimensional video content on the surface of the identified presentation location,
      wherein the intrinsic parameters that define the two-dimensional field of view of the camera include at least one of focal length, focal point, aperture, and/or aspect ratio of the two-dimensional field of view.

12. The method of claim 11, wherein the three-dimensional space includes one or more visible physical features, and wherein the identified presentation location is a surface on a visible physical feature within the three-dimensional space or is a portion of airspace within the three-dimensional space.

13. The method of claim 12, wherein the method further comprises:
   obtaining a model of the three-dimensional space that defines the one or more visible physical features within the three-dimensional space, and wherein one or more presentation locations are predetermined based on the model of the three-dimensional space.

14. The method of claim 11, wherein the two-dimensional video content is modified in accordance with the presence of one or more occluding physical features within the three-dimensional space that occludes or partially occludes the identified presentation location from the field of view of the camera.

15. The method of claim 14, wherein, responsive to the identified presentation location being occluded or partially occluded, the modified two-dimensional video content includes occluding or partially occluding the supplemental content at the identified presentation location from the field of view of the camera, such that the supplemental content appears to be occluded or partially occluded by the one or more occluding physical features.

16. The method of claim 11, wherein the values of the intrinsic parameters and the one or more values of the one or more extrinsic parameters of the camera change based on the progression of the two-dimensional video content.

17. The method of claim 11, wherein the supplemental content includes image content, video content, and text content.

18. The method of claim 11, wherein transformation of the three-dimensional space into a two-dimensional view is based on the values of the intrinsic parameters of the camera, and wherein the values of the intrinsic parameters are obtained from analysis of the obtained two-dimensional video content.

19. The method of claim 11, wherein the one or more values of the one or more extrinsic parameters characterize the relative position of the camera within the three-dimensional space, wherein the one or more extrinsic parameters include at least one of camera location within the three-dimensional space and camera orientation, wherein the camera orientation includes a positional angle of the camera.

20. The method of claim 11, wherein the two-dimensional video content is modified in accordance with scaling information and three-dimensional rotational position for the supplemental content.

* * * * *